US009266433B2

(12) United States Patent  
Bilezikjian et al.

(10) Patent No.: US 9,266,433 B2
(45) Date of Patent: Feb. 23, 2016

(54) LOW COST CHARGER CIRCUIT WITH PRECHARGE

(75) Inventors: John Peter Bilezikjian, Canton, MI (US); Debbi Callicoat, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 623 days.

(21) Appl. No.: 13/555,499

(22) Filed: Jul. 23, 2012

(65) Prior Publication Data

US 2014/0021916 A1   Jan. 23, 2014

(51) Int. Cl.
*H02J 7/00* (2006.01)
*B60L 3/00* (2006.01)
*B60L 3/04* (2006.01)
*B60L 11/18* (2006.01)

(52) U.S. Cl.
CPC ........... *B60L 3/0046* (2013.01); *B60L 3/0092* (2013.01); *B60L 3/04* (2013.01); *B60L 11/1816* (2013.01); *H02J 7/0027* (2013.01); *B60L 2210/12* (2013.01); *B60L 2210/14* (2013.01); *B60L 2270/20* (2013.01); *Y02T 10/7005* (2013.01); *Y02T 10/7225* (2013.01); *Y02T 10/7233* (2013.01); *Y02T 90/127* (2013.01); *Y02T 90/14* (2013.01)

(58) Field of Classification Search
CPC ..................... H02J 7/00; B60L 1/00
USPC ............. 320/109, 132; 701/22; 307/80
See application file for complete search history.

(56) References Cited

U.S. PATENT DOCUMENTS

| 5,994,789 | A | 11/1999 | Ochiai | |
|---|---|---|---|---|
| 7,950,943 | B2 * | 5/2011 | Ohtomo | 439/299 |
| 8,712,619 | B2 * | 4/2014 | Kusumi et al. | 701/22 |
| 2010/0268408 | A1 * | 10/2010 | Yuki | 701/22 |
| 2012/0268066 | A1 * | 10/2012 | Endo et al. | 320/109 |
| 2012/0299377 | A1 * | 11/2012 | Masuda et al. | 307/10.1 |
| 2013/0113290 | A1 * | 5/2013 | Sato et al. | 307/80 |
| 2013/0134939 | A1 * | 5/2013 | Sato et al. | 320/109 |
| 2014/0021916 | A1 * | 1/2014 | Bilezikjian et al. | 320/109 |

\* cited by examiner

*Primary Examiner* — Richard Isla Rodas
*Assistant Examiner* — Dung V Bui
(74) *Attorney, Agent, or Firm* — Maristyn Law LLC; Lynda F. Kouroupis; David B. Kelley

(57) ABSTRACT

A low cost charger circuit with pre-charge functionality can include a DC/DC converter arranged in parallel with a charger device. When used for electrified vehicle applications, the DC/DC converter can be configured to operate during vehicle propulsion, restorable energy storage system (RESS) recharging, and while only the DC/DC converter needs to be energized. A DC/DC converter can be coupled to a first high voltage bus on a load side of a primary contactor, and to a second high voltage bus on an energy side of a primary contactor. A pre-charge circuit can controllably charge a voltage bus and protect a DC/DC converter against high inrush current. An auxiliary contactor can controllably couple a DC/DC converter to a load portion of a high voltage bus. It can also couple a charger thereto. A charger contactor can controllably couple a charger device to an energy portion of a high voltage bus.

20 Claims, 7 Drawing Sheets

CONTACTOR STATES

| OP MODE | PRCH | PC ON BUS W/PRCH | PC ON BUS W/O PRCH | AXC | CC | EFFECT |
|---|---|---|---|---|---|---|
| PRECHARGE | CLOSED | OPEN | CLOSED | CLOSED | OPEN | VEHICLE BUS AND DCDC ARE PRECHARGED |
| PROPULSION | OPEN | CLOSED | CLOSED | CLOSED | OPEN | DCDC AND OTHER PROPULSION LOADS OPERATE, BUT CHARGER NOT POWERED |
| CHARGING | OPEN | CLOSED | OPEN | CLOSED | CLOSED | CHARGING WITH DCDC OPERATIONAL |
| VEHICLE OFF/ SERVICE | OPEN | OPEN | OPEN | OPEN | OPEN | NO LOADS POWERED |

"PRCH" IS PRECHARGE CKT CONTACTOR
"PC" IS PRIMARY CONTACTOR
"PC ON BUS W/PRCH" IS PRIMARY CONTACTOR ASSOCIATED WITH A PRECHARGE CKT
"PC ON BUS W/O PRCH" IS PRIMARY CONTACTOR NOT ASSOCIATED WITH A PRECHARGE CKT
"AXC" IS AUXILIARY CONTACTOR
"CC" IS CHARGER CONTACTOR

FIG. 4

LOW COST CHARGER CIRCUIT WITH PRECHARGE

BACKGROUND OF INVENTION

1. Field of Invention

This invention relates generally to charging circuits for high voltage batteries, and more particularly to high voltage circuits for a vehicle with an electrified propulsion system.

2. Background Art

Electric and hybrid electric vehicles rely on a rechargeable energy storage system (RESS), such as a high voltage battery or battery pack, to provide power for an electric drive system. While regenerative braking during vehicle operation can re-energize a high voltage (HV) battery to a limited extent, additional battery recharging is also necessary. Accordingly, a typical high voltage battery pack can cooperate with a charger device configured to couple it to a power source such as an electric utility. For example, a charger can plug into an electrical outlet at a residence or charging station to enable battery pack recharging.

A charging process is typically conducted while a vehicle is parked and turned off. In a typical electrical architecture, a RESS can be associated with one or more main contactors for coupling the RESS to the high voltage electrical bus for a vehicle, and one or more charger contactors for coupling the RESS to an electrical charger device. During a typical charging process performed while a vehicle is turned off, the charger contactors are closed while the main contactors are open, allowing energy transfer to the RESS while preventing energy transfer to vehicle systems and devices coupled to the high voltage bus. Similarly, during vehicle operation, the main contactors are closed, coupling the RESS to a high voltage power conversion system and other electrical loads, but the charger contactors are open so that a charger device is not energized during vehicle operation.

A vehicle electrical system can include a DC/DC converter configured to step down the high voltage of the RESS to a lower voltage. It is desirable that the DC/DC converter be configured to provide the stepped down voltage during vehicle operation so that the RESS can energize a low voltage vehicle battery and support various low voltage vehicle devices and accessories. Consequently, a DC/DC converter is often coupled to the high voltage bus on the "vehicle side" of the main contactors so that it is coupled to the RESS when the main contactors are closed for vehicle operation.

However, the charging process itself can require various communications and operations by low voltage devices. In addition, preconditioning operations that require low voltage battery support may be performed during vehicle recharging. For example, a consumer may desire that a vehicle cabin be brought to a desired temperature. Because the main contactors are typically open during the charging process, a DC/DC converter coupled to a high voltage bus on the vehicle side of the main contactors cannot be energized by the RESS during the charging process, and therefore cannot support the low voltage battery and vehicle loads associated with the charging or preconditioning processes. As a result, the low voltage vehicle battery can be drained while supporting the preconditioning process during recharging of the RESS.

A possible solution can include closing the main contactors to energize the high voltage buses that couple the DC/DC converter and other vehicle systems to the RESS. However, this solution would, in addition to coupling the DC/DC converter, couple other systems, such as the propulsion system, vehicle heating and ventilation systems, and other various systems during the charging process. A solution that adds loads that reduce the efficiency of the charging process is generally undesirable. A further solution can include moving the DC/DC converter to the RESS side of the main contactors; however, in this configuration the DC/DC converter would be energized at all times unless additional contactors or protective devices were added. Such a condition is generally undesirable because parasitic loads at the DC/DC converter can drain energy away from the high voltage battery. In addition such a configuration can complicate servicing procedures. Finally, a solution can comprise inclusion of a dedicated DC/DC converter, perhaps integrated with a charger device, configured to operate during a charging process. However, this approach requires duplication of sophisticated circuitry and control, which is redundant and not cost-efficient.

SUMMARY OF INVENTION

Systems and apparatus are presented that enable a DC/DC converter, coupled to a rechargeable energy storage system (RESS) and configured to support a low voltage load, to operate while the RESS is being charged, as well as operate while the RESS is not being charged but is supporting a high voltage (HV) load. At the same time, a system can limit or prevent unnecessary energizing of the DC/DC converter, charger and/or other apparatus to improve overall safety and efficiency. By way of example, an electrical circuit for a vehicle can include a RESS coupled to first and second voltage buses of opposing polarity, a charger configured to couple the RESS to an energy source during a RESS charging event, and a DC/DC converter coupled to the first and second voltage buses, wherein the DC/DC converter is configured for operation during the charging process and during vehicle propulsion.

An example system can include a RESS having a first polarity terminal coupled to a first voltage bus and a second opposing polarity terminal coupled to a second voltage bus; a first primary contactor configured to couple a first portion of the first voltage bus to a second portion of the first voltage bus; and a second primary contactor configured to couple a first portion of the second voltage bus to a second portion of the second voltage bus. In this manner each primary contactor can couple an energy side (first) portion of a voltage bus to a load side (second) portion of the voltage bus. A system can further include a DC/DC converter configured to step down the voltage of the RESS to support a low voltage load. In an example system, the DC/DC converter can be coupled to a first (energy) portion of one of the voltage buses, and to a second (load) portion of the remaining voltage bus. By way of example, a system for an electric or hybrid electric vehicle can include a DC/DC converter coupled to a RESS portion of one HV voltage bus, and a vehicle (load) portion of a second (opposing polarity) HV voltage bus. With both primary contactors closed, the vehicle sides of the HV voltage buses can be energized to support various HV vehicle loads, and the DC/DC converter can support low voltage loads. By controllably closing selected contactors of a system, a DC/DC converter can support a low voltage load without unnecessary energizing of an HV vehicle load. By way of example, but not limitation, the invention enables a DC/DC converter to support a low voltage system during vehicle preconditioning processes, low voltage battery maintenance, and HV battery charging periods.

In an example embodiment, a DC/DC converter can be controllably coupled to a load portion of one of the two voltage buses by an auxiliary contactor. By way of example, a charger can also be controllably coupled to the load portion of one voltage bus by the auxiliary contactor, and in addition, can be controllably coupled to an energy portion of the other voltage bus by a charger contactor. A pre-charge circuit can be disposed to controllably charge a load side of a voltage bus. In an example embodiment, the DC/DC converter can be arranged to benefit from the precharge circuit to avoid damage to its components caused by a high charge inrush.

BRIEF DESCRIPTION OF THE DRAWINGS

FIG. 4 shows contact states associated with various operational modes for an embodiment of the invention.

DETAILED DESCRIPTION OF EXAMPLE EMBODIMENTS

As required, example embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which example embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of a vehicle, it will be understood that the present invention is not limited to that particular arrangement.

Figure 1:
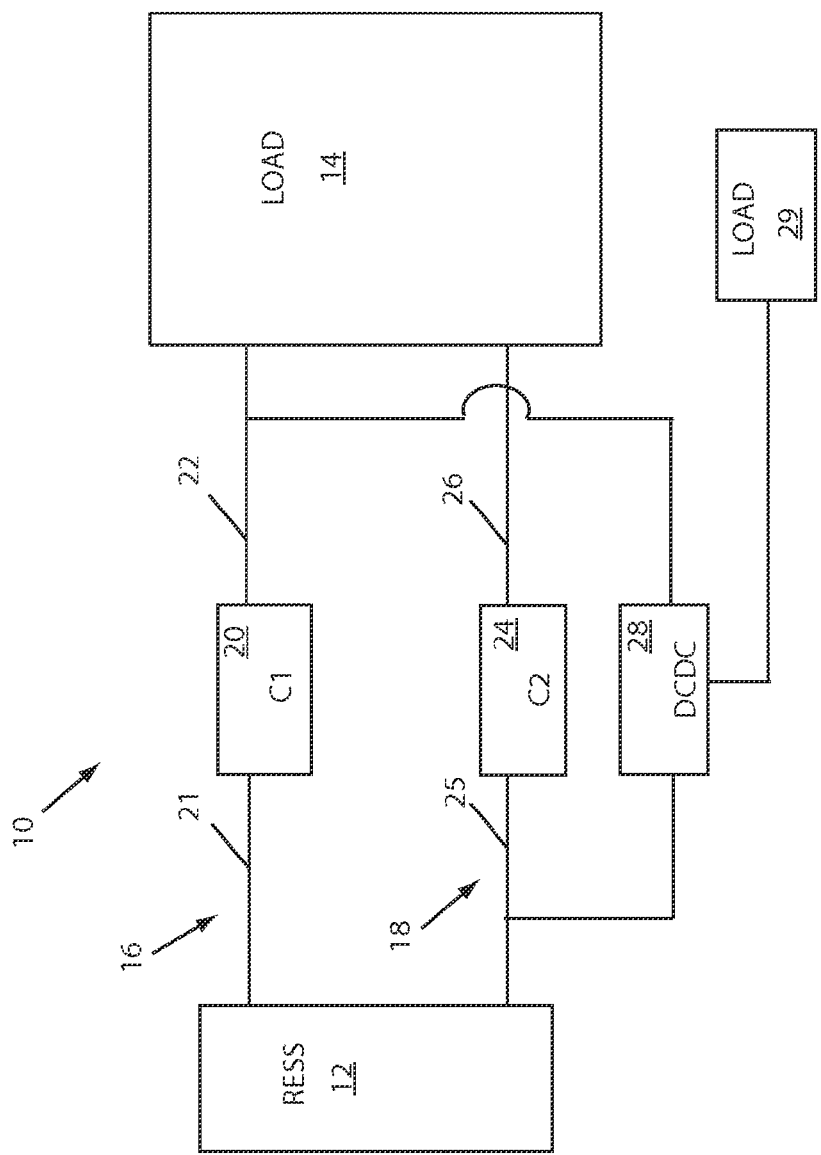
FIG. 1 shows an example system of the invention.

Turning now to the several Drawings in which like reference numerals refer to like elements throughout, FIG. 1 shows a block diagram of an example system 10 having a rechargeable energy storage system (RESS) 12 configured to support a primary load 14. A DC/DC converter 28 can be coupled to the RESS 12 to step down its voltage to support a secondary load 29. The system 10 is configured to enable the DC/DC converter 28 to operate while the RESS 12 is energizing the primary load 14, as well as to operate while the RESS 12 is being recharged.

By way of example, but not limitation, the RESS 12 can be embodied as a high voltage (HV) battery or other energy storage device for an electric vehicle (EV), hybrid electric vehicle (HEV), or plug-in hybrid electric vehicle (PHEV) and the primary load 14 can be embodied as an HV load for the vehicle. For example, a HV battery can comprise a multi-celled 300V lithium ion battery. In an example embodiment, the primary load 14 can comprise a power electronics converter, and may further include other HV systems and accessories associated with an electrified vehicle. The RESS 12 can be coupled to a first voltage bus 16 and a second voltage bus 18, of opposing polarity, in order to energize the primary load 14. First and second primary couplers 20, 24 can be disposed to allow coupling and decoupling of the RESS 12 to the primary load 14. For example, the primary coupler 20 can be configured to couple a first portion 21 of the voltage bus 16 to a second portion 22 of the voltage bus 16. In a similar manner, a second primary coupler 24 can be configured to couple a first portion 25 of the voltage bus 18 to a second portion 26 of the voltage bus 18. Closing of the primary couplers 20 and 24 enables the RESS 12 to energize the load 14. In an example embodiment, the primary couplers can comprise switches embodied as contactors having coils that can be energized and de-energized to provide an electrical connection.

In an example embodiment, the DC/DC converter 28 can be coupled to the first portion 25 of the voltage bus 18, and to the second portion 22 of the voltage bus 16. In this configuration, the DC/DC converter 28 is coupled to an "energy" portion of the voltage bus 18 and to a "load" portion of the voltage bus 16. When the primary couplers 20, 24 are closed to connect the load 14 with the RESS 12, the DC/DC converter 28 can be energized by the RESS 12 to support the secondary load 29. By way of example, the secondary load 29 can comprise low voltage systems and apparatus such as a low voltage vehicle battery and other low voltage modules and vehicle accessories.

Figure 2A:
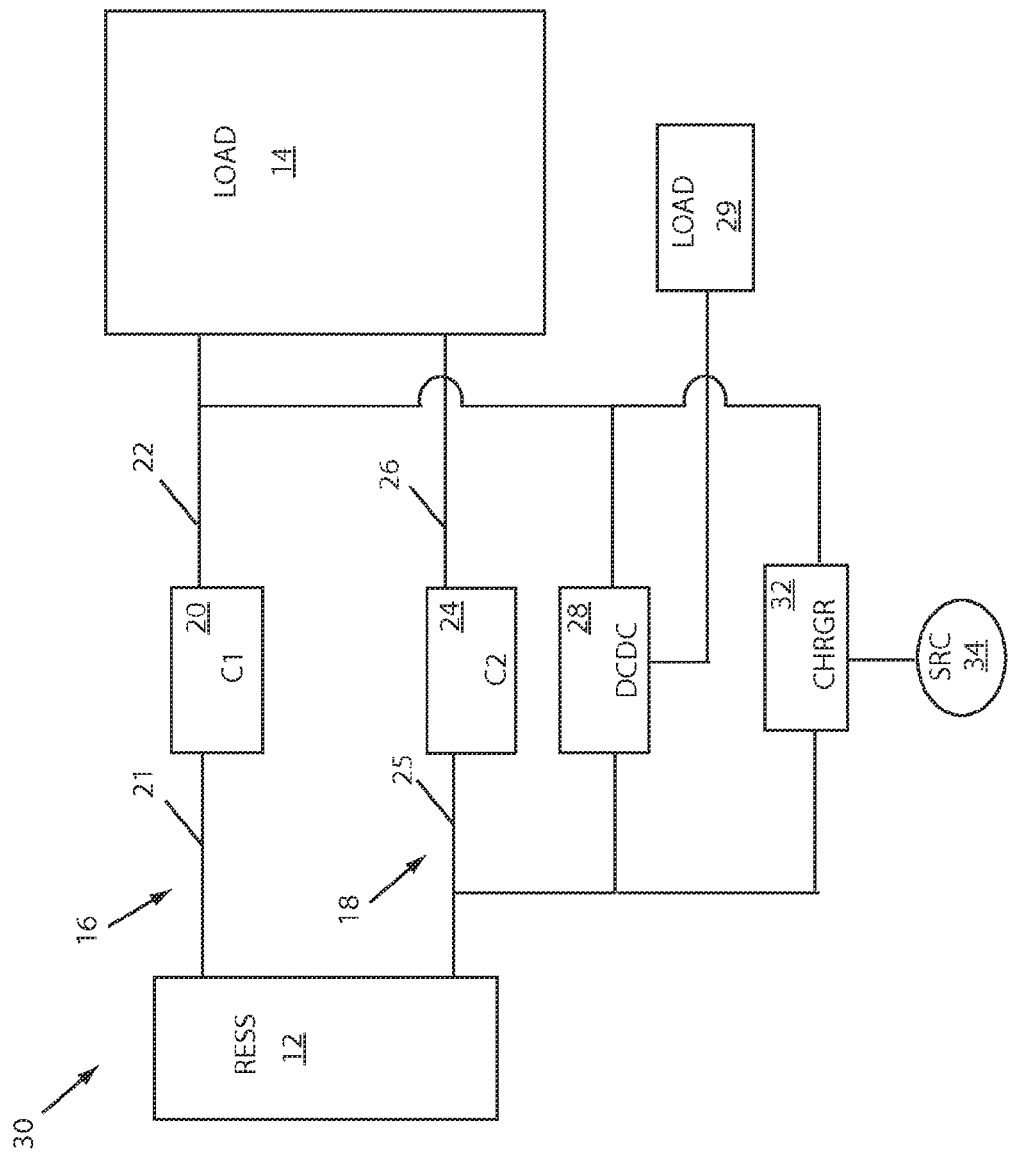
FIG. 2A shows an example system of the invention.

FIG. 2A shows an example embodiment 30 in which a charger 32 is included. The charger 32 can be configured to couple the RESS 12 to an energy source 34 for energizing or charging. In an example embodiment, the energy source 34 can comprise an electrical outlet that provides an alternating current from an electric utility as known in the art. As shown in FIG. 2A, the charger 32 can be coupled to the energy (first) portion 25 of the voltage bus 18 and the load (second) portion 22 of the voltage bus 16. Controllably coupling and decoupling the charger 32 from the RESS 12 can provide a charging mode in which the RESS 12 is charged, but the primary load 14 is not energized, and an operating mode in which the load 14 is supported and the charger 32 is not energized. For example, closing the primary coupler 20, but opening the primary coupler 24 enables the charger 32 to charge the RESS 12 without energizing the primary load 14. It also enables the DC/DC 28 to operate and support the secondary load 29 during the charging process. Thus, a system can prevent depletion of a low voltage vehicle battery used to support various aspects of a charging process. Furthermore, it can provide an opportunity to add energy to a low voltage battery even if it is not being used to support the charging process.

Figure 2B:
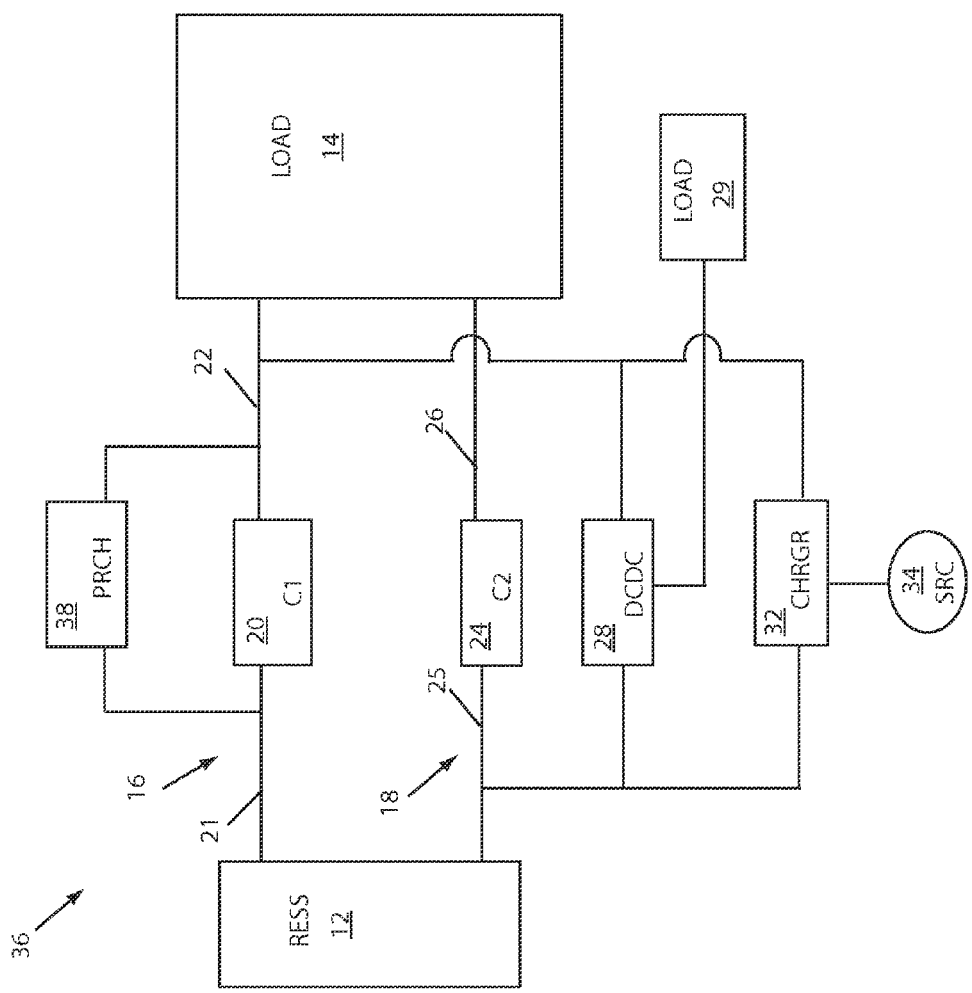
FIG. 2B shows an example system of the invention.

FIG. 2B shows an example system 36 that includes a pre-charge circuit 38. In an example embodiment, the precharge circuit 38 can be arranged to controllably energize a load portion of a voltage bus, and thereby a load coupled to a voltage bus, to avoid damage and complications that can result from a high inrush of current from the RESS 12 through a primary coupler. In an example embodiment, the precharge circuit 38 can be arranged to couple with both first and second portions 21,22 of the voltage bus 16 so that charging of the second portion 22 can be conducted at a slower rate until it has been fully charged. Like the load 14, the DC/DC converter 28 can also benefit from the precharge function.

Figure 3:
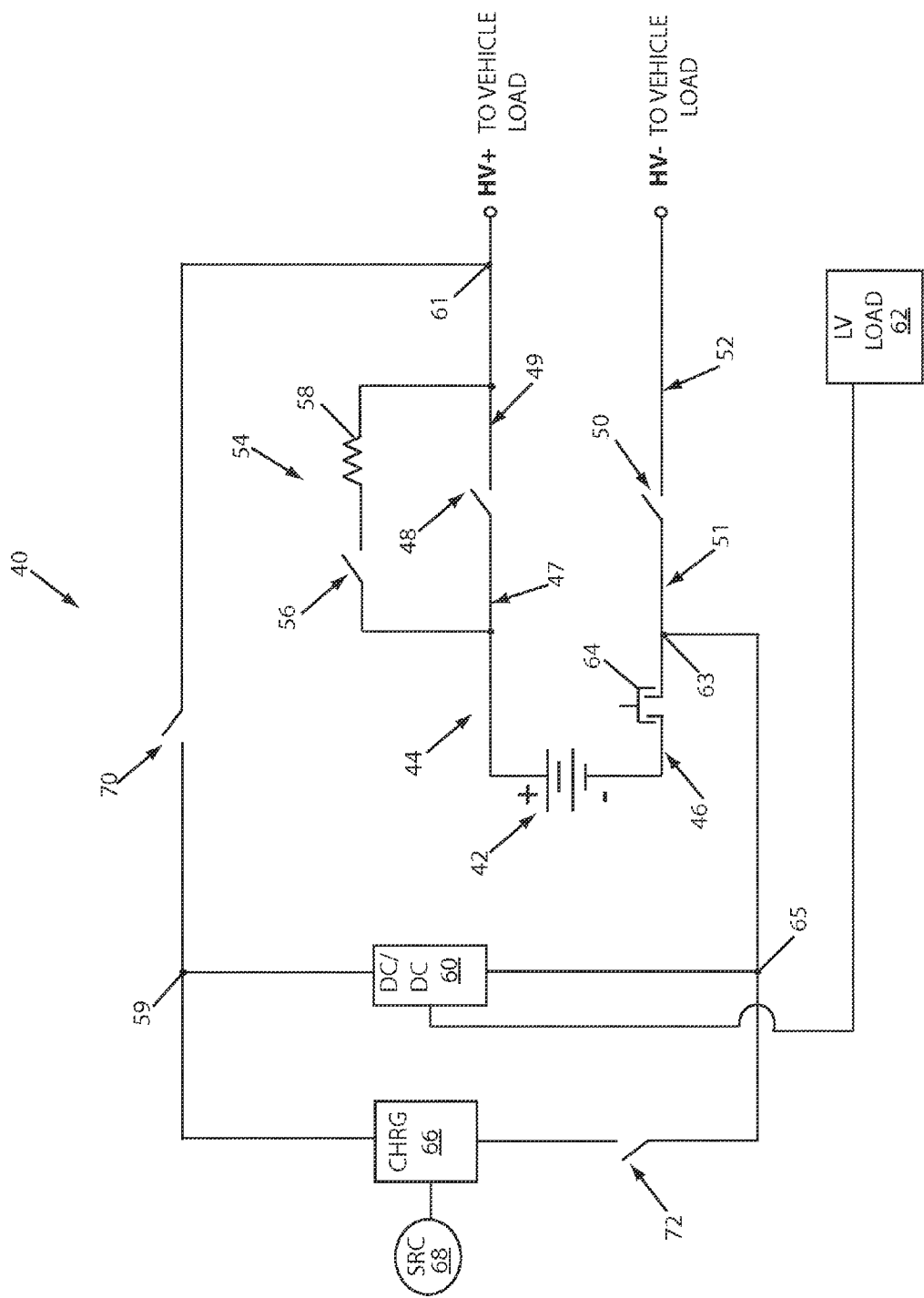
FIG. 3 shows an example circuit of the invention.

FIG. 3 shows an example circuit schematic 40 for a system; however, it is noted that various other circuit arrangements for supporting a system of the invention will occur to those skilled in the art. For illustrative purposes, the schematic 40 will be discussed in the context of deployment in an electric vehicle, however it is understood that a system and circuit of the invention can be variously employed. A high voltage (HV) battery 42 can be coupled to a first voltage bus 44 providing it a first polarity, and to a second voltage bus 46 providing it an opposing polarity. In the present example, the high voltage battery 42 and voltage buses 44,46 are arranged so that the voltage bus 44 has a positive polarity and the voltage bus 46 has a negative polarity. A first primary contactor 48 can be configured to couple a first (energy side) portion 47 of the first voltage bus 44 to a second (load side) portion 49 of the first voltage bus 44. In a similar manner, a second primary contactor 50 can be configured to couple a first (energy side) portion 51 of the second voltage bus 46 to a second (load side) portion 52 of the second voltage bus 46. Closing the primary contactors 44, 46 can allow charging of the voltage portions 49 and 52, enabling them to support a HV vehicle load (not shown).

A pre-charge circuit can be included to control and slow the voltage bus energizing process, preventing a charge inrush from the high voltage battery 42. For example, a pre-charge circuit 54 can be disposed in parallel with the primary contactor 48. The pre-charge circuit 54 can comprise a pre-charge contactor or switch 56 in series with a pre-charge resistor 58. When the pre-charge contactor 56 is closed, the primary contactor 48 can be open and the primary contactor 50 can be closed so that current from the HV battery 42 can flow through the pre-charge circuit 54 to energize the voltage bus portion 49 in a controlled manner. At the conclusion of the pre-charge function, when the voltage bus portions 49,52 are fully charged, the primary contactor 48 can be closed and the pre-charge contactor 56 can be opened to maintain charging of the voltage buses 44,46 at the high potential. The pre-charge circuit 54 can protect the integrity and longevity of a primary contactor. A primary contactor can be damaged or even welded closed by a high charge inrush from a high voltage battery. By waiting until both sides of a voltage bus are fully charged before closing the primary contactor 48, the primary contactor 48 can be protected against adverse effects of any high inrush current.

A DC/DC converter 60 can be included to support a low voltage load 62. As discussed earlier herein, the low voltage load 62 can comprise a vehicle lead acid battery configured to provide power to various vehicle accessories such as power windows, power locks, an entertainment center, windshield wipers, navigational equipment, internal and external lighting, etc. In an example embodiment, the DC/DC converter 60 can be arranged to connect to the first voltage bus 44 at the load side portion 49 via nodes 59 and 61, and connect to the second voltage bus 46 at the energy side portion 51 via nodes 63 and 65. Strategic placement of the node 61 enables the DC/DC converter 60 to take advantage of the pre-charge circuit 54 functionality. Capacitors of a DC/DC converter are typically large and charge at a rate proportional to a difference in input potential. A capacitor having an initial discharged state of zero charge that is connected directly to a high voltage battery, such as the 300V battery that is typically employed in an EV, can be severely damaged if charged too quickly, thereby impairing DC/DC converter operation. Through careful placement of the node 61, the pre-charge circuit 54 can enable capacitors of the DC/DC converter to be charged at a manageable and tolerable rate, protecting the integrity of the DC/DC converter 60.

The DC/DC converter 60 has two inputs, one from the voltage bus 44, and the other from the voltage bus 46. Because the node 61 couples the DC/DC converter 60 with the load side portion 49 of the voltage bus 44, the charge state of input from the voltage bus 44 is dependent on the open/closed state of the primary contactor 48 and the pre-charge contactor 54. When both are open, the voltage bus 44 input will not be energized; if either is closed, the voltage bus 44 input will be energized. However, because the node 63 connects the DC/DC converter 60 with the energy side portion 51 of the voltage bus 46, the voltage bus 46 input is typically energized at all times. Possible exceptions can include when the HV battery 42 is inoperable (e.g. completely discharged) or when the HV battery 42 has been decoupled from the voltage bus 46. For example, a service disconnect (SD) 64 can be disposed to allow manual decoupling of the HV battery 42 to remove it from a vehicle load. For example, a problem may arise with the HV battery 42 itself, or one of the primary contactors 48, 50. The SD 64 can be configured to decouple the HV battery 42 to allow servicing or assembly of the battery 42 itself, a defective circuit element, or part of the vehicle, to be performed in a manner that protects an operator's safety and protects the remaining circuit elements. In an example embodiment, the SD 64 comprises a contactor switch that can be manually controlled.

A charger device 66 can be disposed to enable charging of the HV battery 42 by an energy source 68. In an example arrangement, the charger device 66 can be arranged in parallel with the DC/DC converter 60, coupled to a load side portion of one voltage bus and an energy portion of the remaining voltage bus. In the example embodiment of FIG. 3, the DC/DC converter 60 and charger device 66 can be connected to the load side portion 49 of the voltage bus 44 via the node 61, and the energy side portion 51 of the voltage bus 46 by the node 63. In an exemplary embodiment, an optional auxiliary contactor (AXC) 70 can be disposed to controllably couple and decouple the charger device 66 from the node 61 and the load side portion 49 of the voltage bus 44. As shown in FIG. 3, AXC 70 placement can allow it to decouple the DC/DC converter 60 as well as the charger device 66. When arranged in this manner, the AXC 70 can be opened to allow servicing of the DC/DC 60 and/or charger device 66 without energized input from bus 44, should there be a problem with opening the primary contactor 48, for example when the primary contactor 48 is welded shut.

By way of further example (not shown), the AXC 70 can be positioned between the DC/DC 60 and the charger device 66, for example, between the node 59 and the charger device 66. In such an arrangement, the AXC 70 can be used to decouple the charger device 66 from the voltage bus 44 without decoupling the DC/DC converter 60 from the voltage bus 44. Accordingly, the voltage bus 44 can enable the DC/DC 60 to provide energy to the low voltage load 62 during vehicle propulsion without energizing the charger device 66. This type of configuration may offer an advantage in circuits having a charger with a parasitic load high enough to adversely affect fuel economy. It may also prove beneficial if AC input to a charger became energized without adequate protection at the charger.

Referring again to the exemplary arrangement depicted in FIG. 3, the example circuit 40 can also include an optional charger contactor (CC) 72 configured to decouple the charger device 66 from the remaining voltage bus 46. Thus, an example system can include a controllable contactor for each of the voltage bus inputs to a charger. In an example embodiment, the CC 72 can be configured to decouple the charger device 66 from the voltage bus 46, but not decouple the DC/DC converter 60 from the voltage bus 46. This configuration allows the DC/DC converter 60 to operate during a vehicle propulsion mode when a charger is not in use. For example, during vehicle propulsion, the primary contactors 48 and 50 can be closed, the AXC 70 can be closed, and the charger contactor 72 can be open to decouple the charger 66 from the voltage bus 46. In this configuration the DC/DC converter 60 is coupled to the HV battery 42 enabling it to support vehicle operation, but the charger 66 is not energized. However, while the HV battery 42 is being recharged, the primary contactor 48, and the contactors 70 and 72 can be closed while the primary contactor 50 is open, enabling the charger 66 to recharge the HV battery 42, and enabling DC/DC converter 60 to support associated low voltage loads during the charging process. Maintaining the primary contactor 50 in an open state during recharging can prevent a HV load from being energized during the charge process.

Thus a system of the invention can allow coupling/decoupling of a charger device, enable DC/DC converter operation during vehicle operation as well as during vehicle battery charging, and allow a DC/DC converter to benefit from a pre-charge circuit. By controlling various contactors, various operational modes can be supported, as shown by FIG. 4. In an example embodiment, control of the various contactors can be performed by one or more controllers, such as one associated with a battery energy control module associated with a HV battery, or by a higher vehicle control system or subsystem such as a vehicle system controller, electronic control unit, or the like. It is contemplated that a centralized control system can be configured to control primary contactors, auxiliary and charger contactors, as well as a pre-charge circuit.

Figure 5:
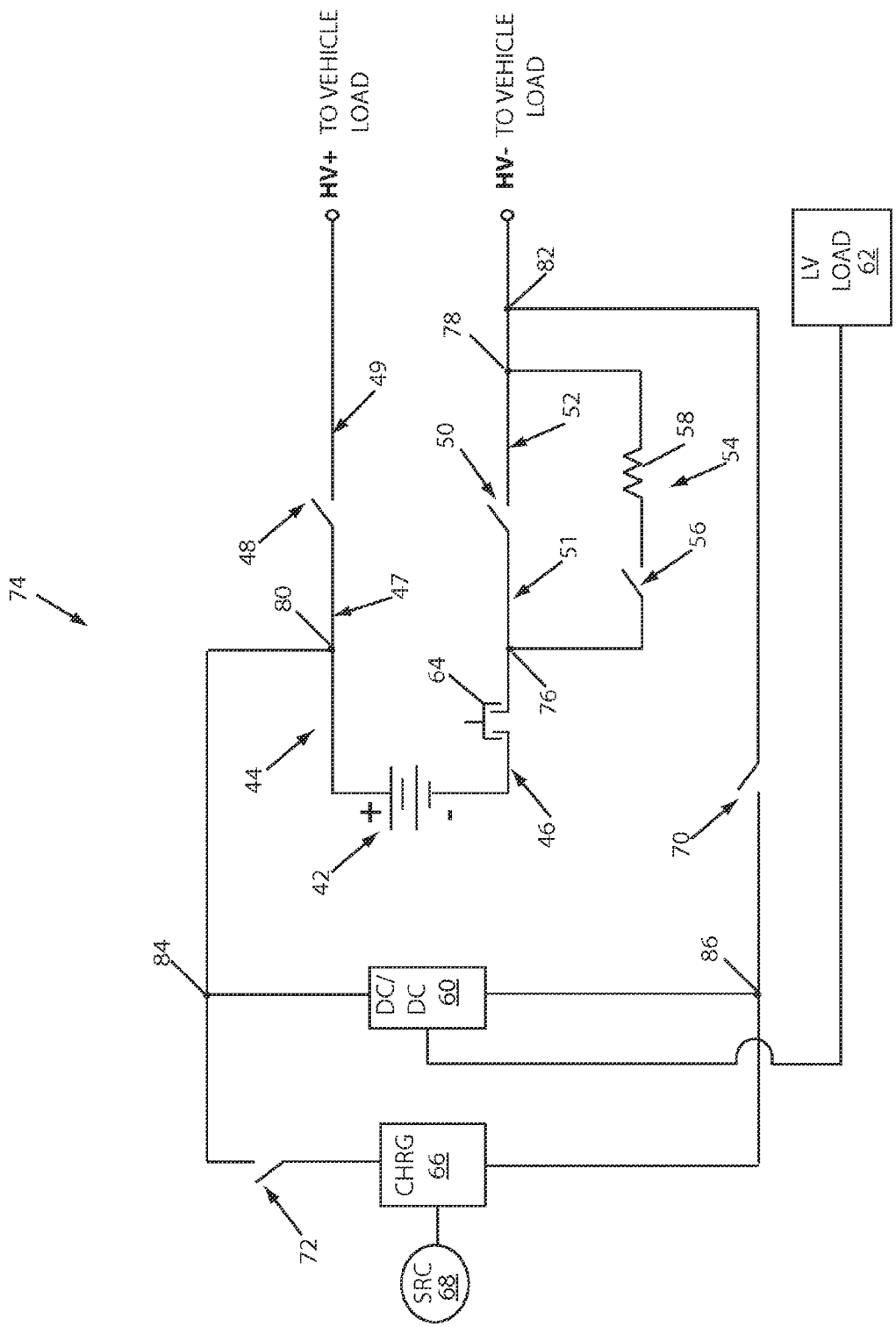
FIG. 5 shows an example circuit of the invention.

While FIG. 3 shows an example arrangement, other arrangements can also be employed to provide a circuit with precharge functionality in which a charger device and/or DC/DC converter is coupled to an energy side of a high voltage bus of one polarity and to a load side of a high voltage bus of opposing polarity. For example, FIG. 5 shows an example 74 in which the pre-charge circuit 54 is disposed across a negative main contactor, primary contactor 50, rather than across a positive main contactor as shown in FIG. 3. The pre-charge circuit 54 can be connected to the voltage bus 46 at a node 76 at the energy side portion 51, and a node 78 at the load side portion 52. In the example 74, the charger device 66 is coupled to the voltage bus 44 at the energy side 47 of the primary contactor 48 via a node 80, and to the voltage bus 46 at the load side 52 of the primary contactor 50 via a node 82. Similarly, the DC/DC converter 60 is coupled to the positive voltage bus 44 at the energy side 47 of the primary contactor 48 via nodes 80 and 84, and to the voltage bus 46 at the load side 52 of the primary contactor 50 via nodes 82 and 86. In this example arrangement, the AXC 70 is configured to couple/decouple the DC/DC converter 60 and the charger device 66 with an HV− bus, namely the voltage bus 46. By way of non-limiting example, the pre-charge circuit 54 and the AXC 70 can be coupled to the same voltage bus. As shown in FIG. 5, a charger contactor can be configured to couple a charger device with a positive voltage bus, as shown by the charger contactor 72 that is configured for coupling the charger device 66 to the voltage bus 44. Thus the charger device 66 can be controllably coupled and decoupled to each of the high voltage buses 44,46, and the DC/DC converter 60 can operate during both propulsion and charging modes, as well as non-charging, non-propulsion modes that require DC/DC converter operation to support a low voltage battery and/or low voltage load.

Figure 6:
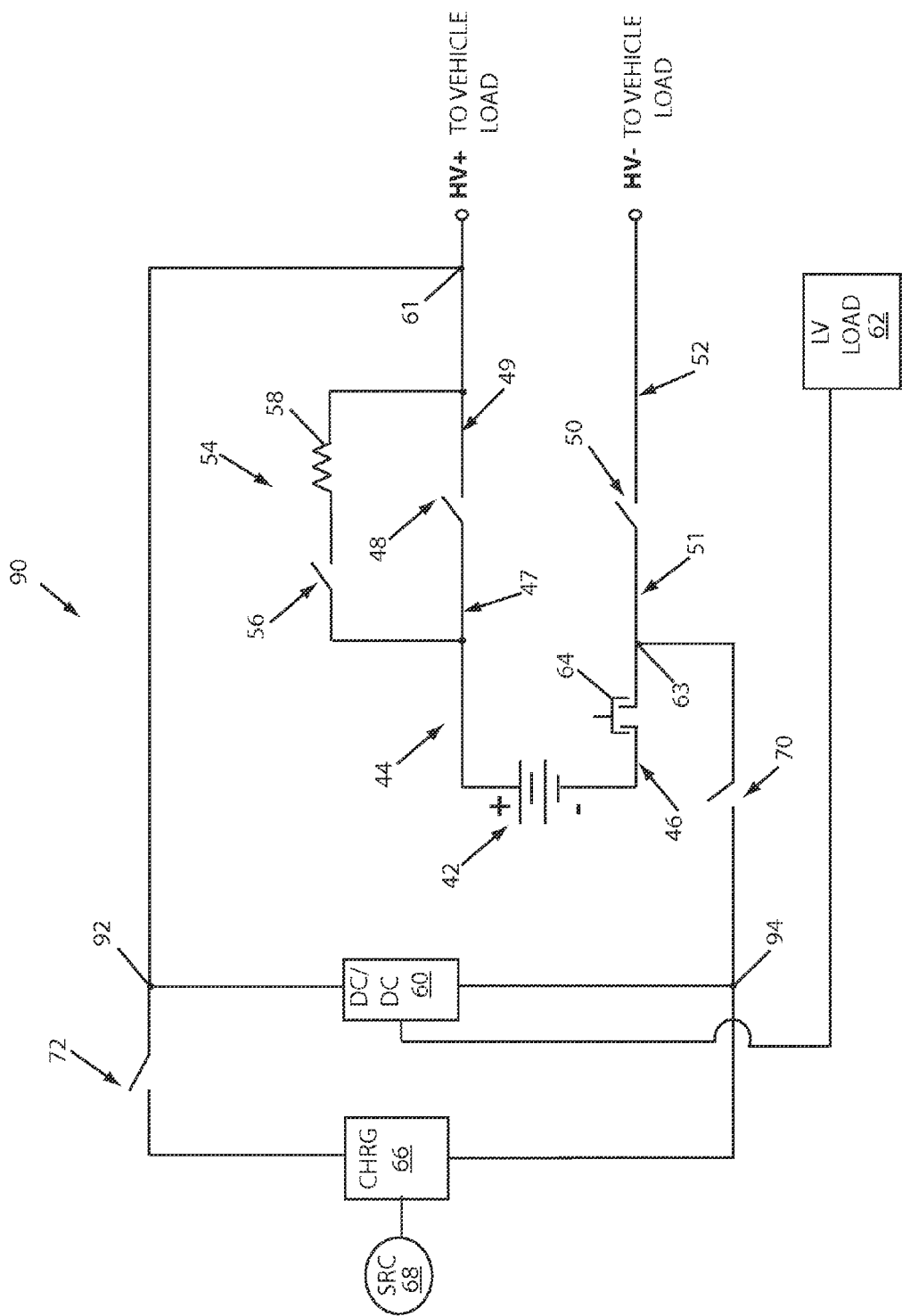
FIG. 6 shows an example circuit of the invention.

As will be understood by those skilled in the art, additional circuit configurations in which pre-charge circuit, charger contactor, auxiliary contactor, and/or service disconnect are variably placed can also be used in the practice of the invention. For example, FIGS. 3 and 5 depict a pre-charge circuit and auxiliary contactor coupled to the same voltage bus, with a charger contactor coupled to an opposing voltage bus. This arrangement can be altered and still provide the functionality of the invention. By way of example, FIG. 6 shows an example circuit 90 in which the pre-charge circuit 54 is coupled to the voltage bus 44, while the AXC 70 is coupled to the opposing voltage bus 46. In the example 90, the DC/DC converter is coupled to the load side portion 49 of the voltage bus 44 by nodes 61, 92 and to the energy side portion 51 of voltage bus 46 by the nodes 63 and 94. The AXC 70 can controllably couple the DC/DC converter 60 and the charger device 66 from the negative voltage bus 46. The charger contactor 72 can controllably couple the charger device 66 from the positive voltage bus 44. Pre-charging of DC/DC converter 60 is maintained as well as simultaneous operation of the charger device 66 and the DC/DC converter 60. Additional circuit configurations will occur to those skilled in the art.

It is noted that an SD can be disposed on a voltage bus of either polarity without affecting circuit functionality. An SD is preferably positioned between an RESS and a primary contactor so that it can be used to decouple a primary contactor and voltage bus from the RESS. For example, a contactor can be damaged and be in need of repair. An SD between a damaged contactor, such as one welded shut, and a battery enables the contactor (and associated load side portion of a voltage bus) to be decoupled from the battery to stop its energization so that it can be replaced in a safe manner. For example, referring to FIG. 5, in a further example embodiment the SD 64 can be positioned on the voltage bus 44 between the RESS 42 and the node 80.

Systems of the invention provide advantages over prior art systems in which a DC/DC converter was coupled to a load side of both an HV+ primary contactor and an HV− primary contactor. In that type of configuration a DC/DC converter typically operated during vehicle propulsion when both primary contactors were closed, but did not operate during battery recharging when both primary contactors were open. As a result, a charger often had to include is own auxiliary converter to support a charging process. The present invention provides a system in which a vehicle DC/DC converter can operate during a high voltage battery recharge process to support a vehicle low voltage battery and load. For example, during a recharge process, a charger can draw power from a vehicle low voltage battery for control circuitry. In addition, other modules, such as a battery energy control module, can be supported during a recharge process with power from a low voltage battery. In some cases, a low voltage load can be increased by a pre-conditioning system that can be activated during a charge process to warm up a vehicle for a driver by turning on blower motors and the like that further task a low voltage battery. Without DC/DC converter operation, there is a risk that a low voltage battery may not be able to provide adequate support.

Additional loads can be expected in the future as a charging process can become more sophisticated. By way of example, but not limitation, public charging stations can be established that incorporate controlled power grid interactions for more efficient resource allocation. For example, a utility may delay charging of vehicles that are parked for an extended period, such as those parked at an airport charging station. As a result, control communications designed to wake up particular modules to initiate a delayed charging process may require low voltage power. By the same token, a consumer may park a vehicle at a charging outlet and desire to delay a charging process to take advantage of lower electricity rates that may be offered during off-peak hours. Enabling a DC/DC converter to support a low voltage battery during both charging and propulsion modes enables batteries to become smaller even as loads can become larger.

While several example circuit arrangements have been depicted in order to teach various aspects of the invention, the invention is not limited to the examples discussed herein as it is understood that further examples circuits within the scope of the appended claims will occur to those skilled in the art.

What is claimed:

1. An electrical circuit for a vehicle, comprising:
a rechargeable energy storage system (RESS) configured to couple first and second voltage buses of opposing polarity to provide energy to a primary high voltage propulsion load coupled to said RESS via a first primary contactor (PC) at said first voltage bus and a second PC at said second voltage bus;
a charger device configured to couple said RESS to an energy source during an RESS charging process;
a DC/DC converter configured to couple said first and second voltage buses, configured to provide energy to a secondary low voltage load, said DC/DC converter configured to releasably couple said first voltage bus or said second voltage bus; and
wherein said DC/DC converter is configured for operation during said charging process and during a propulsion mode of said vehicle.

2. The circuit of claim 1, wherein said DC/DC converter is arranged in parallel with said charger device having a first common connection with said first voltage bus and having a second common connection with said second voltage bus.

3. The circuit of claim 1, further comprising a pre-charge circuit coupled to said RESS and configured to enable pre-charging of said DC/DC converter.

4. The circuit of claim 1, further comprising a manual service disconnect (SD) coupled to one of said first and second voltage buses between said RESS said PC, and configured to decouple said RESS from said one of said first and second voltage buses.

5. The circuit of claim 1, further comprising a charger contactor configured to releasably couple said charger device to one of said first and second voltage buses, and an auxiliary contactor configured to releasably couple said DC/DC converter to the other of said first and second voltage buses.

6. The circuit of claim 1, wherein said DC/DC converter is configured to couple one of said voltage buses between said RESS and one of said primary contactors.

7. The circuit of claim 1, wherein said DC/DC converter is configured to couple said charger at a first node, and both said DC/DC converter and said charger are configured to couple said first voltage bus at a second node.

8. The circuit of claim 1, wherein said DC/DC converter is coupled to said charger at a first node, and both said DC/DC converter and said charger are coupled to said second voltage bus at a second node.

9. The circuit of claim 1, wherein said DC/DC converter is configured to be operational while coupled to one of said first and second voltage buses and decoupled from said other of said first and second voltage buses.

10. The circuit of claim 1, further comprising a charger contactor configured to releasably couple said charger to said first voltage bus or said second voltage bus, wherein said charger contactor is disposed between said charger and said DC/DC converter.

11. A system comprising:
a rechargeable energy storage system (RESS) having a first polarity terminal coupled to an energy side portion of a first voltage bus, and an opposing polarity terminal coupled to an energy side portion of a second voltage bus, said first and second voltage buses configured to couple said RESS with a primary high voltage load;
a first primary contactor (PC) configured to couple said energy side portion, between said RESS and said first PC, of said first voltage bus to a load side portion of said first voltage bus between said first PC and said primary load;
a second PC configured to couple said energy side portion of said second voltage bus, between said RESS and said second PC, to a load side portion of said second voltage bus, between said second PC and said primary load;
a DC/DC converter, configured to provide energy to a secondary low voltage load, configured to couple one of said first and second voltage buses at an energy side portion, and to couple the other of said first and second voltage buses at a load side portion; and
wherein said DC/DC converter is configured to releasably couple said first voltage bus or said second voltage bus.

12. The system of claim 11, further comprising a charger device configured to provide energy to said RESS from an energy source, wherein said DC/DC converter is configured to operate during a charging mode while said charger device provides energy to said RESS.

13. The system of claim 12, wherein said charger device is arranged in parallel with said DC/DC converter, sharing a first common connection to said first voltage bus, and sharing a second common connection with said second voltage bus.

14. The system of claim 11, further comprising a pre-charge circuit coupled to one of said first and second voltage buses, configured to pre-charge said DC/DC converter.

15. The system of claim 11, further comprising a charger contactor configured to releasable couple said charger device to one of said first and second voltage buses, and an auxiliary contactor (AXC) configured to releasably couple said DC/DC converter to one said other of said first and second voltage buses.

16. The system of claim 11, further comprising a service disconnect (SD) between said RESS and one of said PCs, configured to decouple said RESS from one of said first and second voltage buses.

17. The system of claim 16, wherein said SD is configured to decouple said DC/DC converter from said RESS.

18. The circuit of claim 11, wherein said DC/DC converter is configured to be operational while coupled to either said first or second voltage bus and decoupled from said other of said first and second voltage buses.

19. A system, comprising:
a rechargeable energy storage system (RESS) coupled to a vehicle bus comprising first and second voltage buses;
a first primary contactor (PC) at a first voltage bus configured to couple said RESS and a propulsion load;
a second PC at said second voltage bus configured to couple said RESS and said propulsion load;
a DC/DC converter configured to provide energy to a secondary low voltage load releasably coupled to one of said voltage buses by an auxiliary contactor;
a charger configured to provide energy to said RESS from an ac source releasably coupled to the other of said vehicle buses by a charger contactor; and
wherein, via control of said first and second PCs, said charger contactor and said auxiliary contactor, said system is configured to provide a propulsion mode in which said DC/DC converter and said propulsion load are powered but said charger is not, and a charging mode in which said charger charges said RESS, said DC/DC charger is operational and said propulsion load is not energized.

20. The system of claim 19, further comprising a pre-charge circuit coupled to said vehicle bus, wherein said system is configured to provide a pre-charge mode in which said vehicle bus and said DC/DC charger are pre-charged and said charger is not operational.

* * * * *